(12) United States Patent
Hazel

(10) Patent No.: US 6,381,891 B1
(45) Date of Patent: May 7, 2002

(54) PORTABLE DETACHABLY MOUNTABLE IDENTIFICATION AND PERSONAL DATA STORAGE AND DISPLAY DEVICE

(76) Inventor: Diane H. Hazel, Six S. Delaware Dr., Central Nyack, NY (US) 10960-2312

( * ) Notice: Subject to any disclaimer, the term of this patent is extended or adjusted under 35 U.S.C. 154(b) by 0 days.

(21) Appl. No.: 09/536,519

(22) Filed: Mar. 28, 2000

(51) Int. Cl.[7] .............................. G09F 7/02; B65D 85/57
(52) U.S. Cl. ...................... 40/640; 206/308.2; 206/818; 40/655
(58) Field of Search .......................... 40/640, 725, 726, 40/655, 124.04; 206/307, 308.2, 308.1, 818

(56) References Cited

U.S. PATENT DOCUMENTS

| | | | | |
|---|---|---|---|---|
| 2,088,672 A | * | 8/1937 | Steinthal ....................... | 40/726 |
| 2,302,560 A | * | 11/1942 | Latona .......................... | 40/640 |
| 2,384,633 A | * | 9/1945 | Markowski .................... | 40/640 |
| 4,001,960 A | * | 1/1977 | Holson .......................... | 40/159 |
| 4,377,047 A | | 3/1983 | Adams, Jr. et al. | |
| 4,588,321 A | * | 5/1986 | Egly ............................. | 402/77 |
| D284,581 S | | 7/1986 | Peterson | |
| 4,640,413 A | * | 2/1987 | Kaplan et al. ................ | 206/232 |
| 4,838,709 A | * | 6/1989 | Guerriero et al. ........... | 190/119 |
| 4,897,947 A | | 2/1990 | Kass-Pious | |
| 4,984,683 A | | 1/1991 | Eller | |
| 5,052,081 A | | 10/1991 | Fuehrer | |
| 5,207,717 A | * | 5/1993 | Manning ...................... | 206/232 |
| 5,312,136 A | | 5/1994 | Capozzola | |
| 5,343,608 A | | 9/1994 | MacDonald | |
| 5,772,019 A | * | 6/1998 | Reed ......................... | 206/308.1 |
| D401,054 S | | 11/1998 | Hartmann et al. | |
| 5,938,242 A | * | 8/1999 | Ryan ............................ | 281/38 |
| 6,105,762 A | * | 8/2000 | Pettey ......................... | 206/232 |
| 6,224,474 B1 | * | 5/2001 | Vander Voort .............. | 451/494 |

* cited by examiner

Primary Examiner—Lynne H. Browne
Assistant Examiner—Kenn Thompson
(74) Attorney, Agent, or Firm—William L. Muckelroy, P.C.; Arthur Lessler, Esq.

(57) ABSTRACT

A lockable portable releasably attachable identification and data carrier device is provided with a magnet for detachably mounting on refrigerator door or the like. The data carrier has at least one steel foil pouch for storing and shielding a magnetic storage computer disk containing data pertinent to the user and a computer program which when inserted into a computer having an internet service connecting program thereon enables the connecting program and identifies the identification code of the computer into which the disk is inserted and sends an email to a predetermined email address with the identification code and predetermined data pertinent to the user.

11 Claims, 1 Drawing Sheet

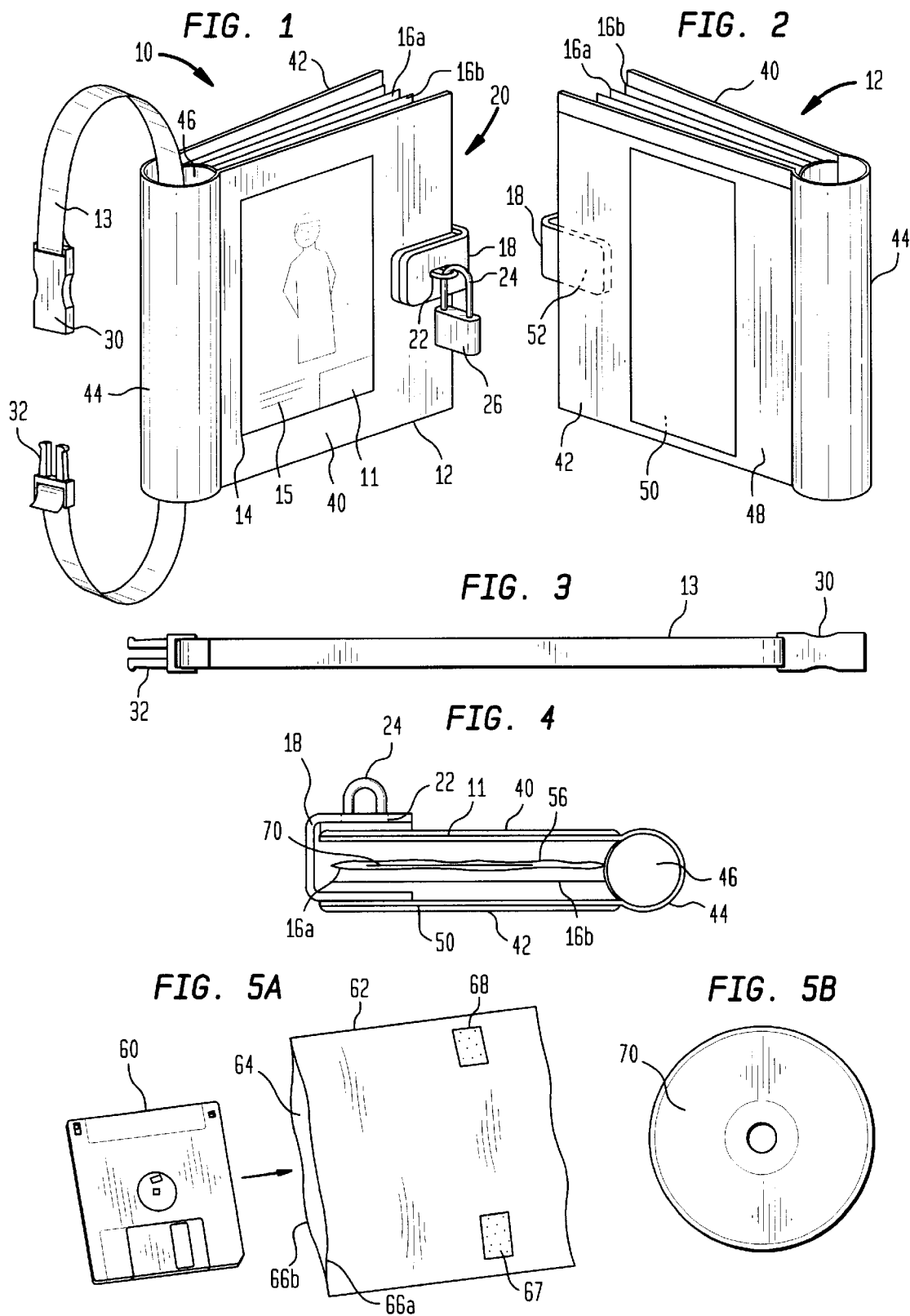

PORTABLE DETACHABLY MOUNTABLE IDENTIFICATION AND PERSONAL DATA STORAGE AND DISPLAY DEVICE

CROSS REFERENCE TO RELATED APPLICATIONS AND/OR PRIORITY CLAIMS

None.

FIELD OF THE INVENTION

This invention relates to an identification structure and use of a portable detachably mountable identification and information compartment and tag which may be placed on an adult, child, or pet with special needs or on or in a bookbag, purse, or pocket and stored in a common area when the adult, child or pet is inside its home.

BACKGROUND OF THE INVENTION

Eller in U.S. Pat. No. 4,984,683, issued Jan. 15, 1991 disclosed a related decorative piece of personal jewelry, such as, a locket worn on a chain around the neck of the user or a bracelet worn on the wrist of the user. A compartment within the piece of jewelry contains an attached identification and medical history of the wearer. The attached document is constructed of a waterproof paper or the like and when the paper extends beyond the edge of the jewelry, the medical history and identification of the wearer is revealed. The document is fan folded within the compartment and concealed from an observer of the jewelry when the jewelry is worn. A symbol recognizable by medical trained personnel is positioned in a prominent location on the outer surface of the jewelry.

Examples of such related devices are described in U.S. Pat. No. 4,377,047 to Adams issued on Mar. 22, 1983; U.S. Pat. No. 5,312,136 to Capozzola issued on May 17, 1994, U.S. Pat. No. 5,343,608 to MacDonald issued on Sep. 6, 1994; U.S. Pat. No. 4,897,947 to Kass-Pious issued on Feb. 6, 1990; and, U.S. Pat. No. 5,052,081 to Fuhrer issued on Oct. 1, 1991.

Related designs are a patent for the ornamental design for a magnetic key case in U.S. Design Pat. No. D 401,054 issued on Nov. 1, 1998 and a patent for the ornamental design for emergency microfilmed medical and identification records.

Identification tags of various designs and configurations are commonly used to identify children and adults with medical problems such as allergies, diabetes, etc.

Environmental and safety considerations have limited what identification tags are acceptable under human engineering considerations.

The attachment of identification tags around the neck or extremity such as a wrist or ankle has been most prominent. However, the attachment is usually by means of a chain in contact with the skin. The chain and tag must be manufactured of a material that will not corrode. The usual material chosen is silver or gold making this method of identification expensive.

Further, the wearing of chains around the neck, wrist or ankle introduce a safety hazard to the user. The chain can become entangled in clothing and machinery and is a shock hazard in this age of the proliferation of electronic devices. In addition, the chain tag is visible to others and subjects the user to the subtleties of overt subliminal discrimination against persons with a "medical condition" such as AIDS. Finally, the user may forget to put on a chain type ID.

Some approaches have utilized microdots attached to the dental surface of the user. A special reader not readily available in the field is required to make use of this arrangement.

Some approaches to solve the problems have been to attach identification tags to articles of clothing. One such approach utilizes a strong fiber paper with a hole through which a shoelace is threaded to attach the paper to the outside of a shoe.

This solves the problem of safety but does not solve the problem of protecting the tag from the wear and tear of the elements and destruction by contamination.

A solution to this problem was described in U.S. Pat. Nos. 4,858,957 and 4,863,195. Each solution required the placement of a notational strip within the shoe and covering the notational strip with a separate clear sheet. After placement of the notational strip within the shoe, the user found difficulty in aligning the clear strip over the notational strip and applying the clear sheet without wrinkles within the confines of the shoe.

This solves only one aspect of the problem of placement of the identification and information carrier on the body of the person and attachment of the carrier to the body. However, there has remained to this day the problem of how to make the carrier repetitively detachable from the bearer or wearer and storably mountable at a site within the home so that a child of school age can readily and routinely re-attach the carrier on a daily basis.

Another aspect and problem is how to easily make this information available for updating on a daily basis and to make it readily available for mounting either on the child such as on a chain around the child's neck or on some object the child carries daily such as a bookbag. In the case of an infant, the carrier could be mountable on a diaper bag, for example.

Thus, there has long been a need for an arrangement to identify a person and specify any particular medical needs peculiar to that person on an, ongoing or daily basis as in a log form.

It is desired that the identification tag be attachable to an accessible part of the person such as clothing in addition to around the neck or extremity of the person.

Further, it is desired that the identification tag have a means for displaying a photograph of the person that is protected from wear and soiling.

It is further desired that the identification tag not publicly display confidential information as to the medical condition of the user.

SUMMARY OF THE INVENTION

Accordingly, it is an object of the present invention to provide an Improved combination of an identification tag and information or data carrier attachable to the person to identify the person along with a provision for notation of any medical needs of the person on both sheets of paper and optionally on a recordable CD or computer diskette which may be inserted into and magnetically shielded by the pocket of the carrier.

It is another object of the present invention to provide an improved identification tag and data carrier, which has a compartment protected from magnetic fields.

It is yet another object of the present invention to provide an improved identification tag which is public, worn in public view yet provides a capability available to communicate vital medical information via computer diskette or CD should the user be unconscious.

It is yet still another object of the present invention to provide an improved identification tag and data carrier with information stored on either a magnetic or CD medium which when inserted into a computer automatically sends an email message to a specified email address, retrieves the identification code of the computer into which it is inserted and transmits that code along with the prescribed email message.

The above and other objects of the present invention are achieved, according to a preferred embodiment thereof by providing an identification tag and a carrier with a surface which will accept written or typewritten notation and, a carrier with a magnetic shielding capacity to protect a computer diskette with a repetitively usable adhesive surface for attaching to a paper sheet on multiple occasions.

In the preferred embodiment, the surface of the pouch used to house the diskette is coated with a specially adapted adhesive to be adhesively removable from any side of the paper in the carrier in the same manner as the glue used for stacked sheets of Post It™ notes.

With the diskette or CD containing vital yet confidential medical and other types of information, the user's privacy is protected from inadvertent exposure to the public.

Further, the magnetically shielded pouch for the diskette in the carrier protects data stored on the diskette from being damaged due to the use of a magnet to mount the carrier on a steel refrigerator door or similar surface in a convenient and common kitchen area of a home.

BRIEF DESCRIPTION OF THE DRAWINGS

The novel invention may be more fully understood by reference to the description of the preferred embodiment, the claims, and the accompanying drawings wherein:

FIG. 1 depicts the novel device made up of an identification tag, carrier, and attachment belt and magnetic mount combination;

FIG. 2 shows the reverse flat side of the device shown in FIG. 1;

FIG. 3 depicts the attachment belt of the novel device;

FIG. 4 is a top view of the novel device a s shown in FIGS. 1 and 2;

FIG. 5a is a perspective view of a steel foil pouch receiving a computer disk; and, FIG. 5b is a view of a rewritable CD computer disk.

DESCRIPTION OF THE PREFERRED EMBODIMENT

The novel device is shown in FIG. 1 as a combination identification and data storage item 10 made up of an identification tag 11, data carrier 12 and an attachment means or belt 13. The identification tag 11 is made of a photograph 14 of the proposed bearer with text 15 indicating information about the proposed bearer such as name. address, phone numbers, and age, for example.

The data carrier 12 is a book, for example, of at least one set of a paper page and plastic page wherein the plastic page is a pouch-like structure or plastic pouch 16a (next to a paper page 16b) with an opening adapted to receive either inserts of paper or a CD-RW, CD-ROM or the like. A closure 18 for the carrier 12 is located across its opening 20. The closure 18 is a strip of tough material such as plastic for example. The closure 18 is shown with an aperture 22 through which extends a locking loop 24. The locking loop 24 is adapted to receive a lock 26 such that the contents of the data carrier 12 or book are sealed except for forcible entry.

The belt 13 has a receptacle 30 and a pronged end 32. The receptacle 30 is part of a latching means for selectively connecting and disconnecting the pronged end 32 thereof from the receptable 30. Selectively connecting and disconnecting the pronged end 32 enables the data carrier 12 to attach to a personal object of the user such as a bookbag or to the user via a wrist or neck. The data carrier 12 has a front cover 40 connected to a back cover 42 by, means of a tubular spine 44. The tubular spine 44 has an opening 46 which extends through it and which enables the belt 13, made of fabric for example, to extend through the opening 46.

The rear or back cover 42 of the data carrier 12 is illustrated in FIG. 2.

There is a shown a plastic pouch 48 making up a part of the back cover 42 with a flattened magnet contained therein and oriented such that the back cover 42 of the data carrier 12 may be attached to a refrigerator door capable of magnetic attachment. Of particular note is the closure 18 that is attached with a permanent adhesive 52 to the back cover 42. The back cover 42 has outside surface for attachment to a refrigerator or the like and an inside surface. The closure 18 is attached to the inside surface of the back cover 42 insure that the magnet 50 can readily attach the data carrier 12 to a surface and hold it there.

Referring to FIG. 4, there is shown the closure 18 with the loop 22 extending through the aperture 24. The lock 26 is omitted. Similarly, the tubular aperture 46 is shown extending through the tubular spine 44 with the belt 13 omitted. Front and back sides 56 of the plastic pouch 16a are shown. The plastic pouch 16a is adjacent the paper page 16b. The identification tag 11 is inside the cover 40. The front cover 40 is shown connected via the tubular spine 44 to the back cover 42.

Shown in FIG. 5a is a computer disk 60. There is a steel foil pouch 62 adapted with an opening 64 formed by a front panel 66a selectively jointed to a back panel 66b. There are special adhesive patches 67 and 68 attached to the front panel 66a. The adhesive patches 67 and 68 are formed from the same type of releasable and re-adhering glue used to construct Post It™ paper sheets. The pouch 62 is made of steel foil such that the disk 60 when inside the pouch is shielded from the magnetic field associated with the magnet 50.

A CD-RW disk 70 is shown in FIG. 5b. It is contained within the plastic pouch 16a as shown in FIG. 4. The CD-RW disk 70 and/or the computer disk 60 is loaded with an off-the-shelf computer program which locates the identification code of a computer into which it is inserted and actuates any internet connection available to the computer and sends an email message to a preloaded email address with the identification code of the computer into which the disk 60 or disk 70 is loaded and other preloaded data on the disk 60 or 70, respectively.

It This concludes the description of a preferred embodiment of the present invention. Those skilled in the art may find many variations and adaptations failing within the scope of this invention, and the appended claims are intended to cover all such variations and adaptations falling within the true scope and spirit of the invention. And, while a specific embodiment of the device containing identification and data concerning the wearer have been shown and fully explained above for the purpose of illustration it should be understood that many alterations, modifications and substitutions may be made to the instant invention disclosure without departing from the equivalents of the invention as defined by the appended claims.

Parts List combination identification and data storage item 10 data carrier 12 belt 13
identification tag 11
photograph 14
text 15
plastic pouch 16*a*
paper page 16*b*
closure 18
opening 20
aperture 22
locking loop 24
lock 26
receptable 30
pronged end 32
front cover 40
back cover 42
tubular spine 44
opening 46
permanent adhesive 52
magnet 50
computer disk 60
steel foil pouch 62
opening 64
front panel 66*a*
panel 66*b*
first adhesive patch 67
second adhesive patch 68
rewritable CD computer disk 70

What is claimed is:

1. An improvement in a combination identification tag, magnet, and information carrier having a plurality of pages, the combination being demountably attached to a person or a personal object of the person magnetically mountable and demountable on a magnetic surface using a magnet, the carrier having a first transparent side and pouch combination for carrying and displaying a photograph the improvement comprising at least one of said pages having a steel foil pouch detachably mounted thereon with a releasing and re-adhering adhesive layer, the pouch containing magnetically stored data on an computer readable object magnetically readable by a computer.

2. The device of claim 1 wherein said carrier is a lockable book of pages.

3. The device of claim 2 wherein said carrier is a lockable book of pages containing at least one page which is a pouch adapted to receive and hold a compact disk.

4. The device of claim 3 wherein the carrier has another side which has a pouch containing a thin magnet adapted to attach the carrier to a surface to which a magnet is capable of being magnetically attached.

5. The device of claim 4 wherein the carrier further comprises an opening means for receiving a belt-like member.

6. The device of claim 5 wherein the device further comprises a belt-like member means for demountably attaching the carrier around a body part of the person or to the personal object of the person.

7. The device of claim 5 wherein the carrier further comprises a belt-like member having an openable and reclosable snap fastener for detachably connecting the carrier to a personal object.

8. The improved combination of claim 1 wherein said computer readable object is a computer disk having stored thereon software means adapted to automatically send an email message to a pre-specified email address.

9. The improved combination of claim 8 wherein said computer readable object is a computer disk having stored thereon software means adapted to automatically read the identification code of a computer into which it is inserted and send an email message containing said identification code to, a pre-specified email address.

10. An improvement in a combination identification tag, magnet, and information carrier having a plurality of writable pages, the combination being demountably attached to a person or a personal object of the person magnetically mountable and demountable on a magnetic surface using a magnet, the carrier having a first transparent side and pouch combination for carrying and displaying a photograph the improvement comprising at least one of said pages having data thereon regarding the family of the person which is erasably written and editable, the combination further comprising a locking means for sealing the carrier except for destructive irreparable entry.

11. An improvement in a combination identification tag, magnet, and information carrier having a plurality of writable pages, the combination being demountably attached to a person or a personal object of the person to magnetically mountable and demountable on a magnetic surface using a magnet, the carrier having a first transparent side and pouch combination for carrying and displaying a photograph the improvement comprising at least one of said pages having data thereon regarding the family of the person which is erasably written and editable.

* * * * *